United States Patent
Jia et al.

(10) Patent No.: US 9,866,364 B2
(45) Date of Patent: Jan. 9, 2018

(54) SYSTEM AND METHOD FOR SEMI-ORTHOGONAL MULTIPLE ACCESS

(71) Applicant: Huawei Technologies Co., Ltd., Shenzhen (CN)

(72) Inventors: Ming Jia, Ottawa (CA); Jianglei Ma, Ottawa (CA); Peiying Zhu, Kanata (CA); Hao Hu, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/589,676

(22) Filed: Jan. 5, 2015

(65) Prior Publication Data

US 2016/0065401 A1    Mar. 3, 2016

Related U.S. Application Data

(60) Provisional application No. 62/044,061, filed on Aug. 29, 2014.

(51) Int. Cl.
*H04L 5/02* (2006.01)
*H04L 27/04* (2006.01)
(Continued)

(52) U.S. Cl.
CPC .............. *H04L 5/02* (2013.01); *H04L 5/0003* (2013.01); *H04L 5/04* (2013.01); *H04L 5/12* (2013.01);
(Continued)

(58) Field of Classification Search
CPC ....... H04L 27/04; H04L 27/06; H04L 5/0057; H04L 5/006; H04L 5/02; H04L 27/34; H04L 27/0008
See application file for complete search history.

(56) References Cited

U.S. PATENT DOCUMENTS 7,103,325 B1* 9/2006 Jia ..................... H04B 7/0619
                                                              370/329
7,346,074 B2* 3/2008 Moon ..................... H04H 20/44
                                                              370/342
(Continued)

FOREIGN PATENT DOCUMENTS

CN       102594768 A       7/2012
CN       102783111 A      11/2012
(Continued)

OTHER PUBLICATIONS

Saito, Y., et al., "Non-Orthogonal Multiple Access (NOMA) for Cellular Future Radio Access," Vehicular Technology Conference (VTC), Jun. 2013, 5 pages.
(Continued)

*Primary Examiner* — Jean B Corrielus
(74) *Attorney, Agent, or Firm* — Slater Matsil, LLP

(57) ABSTRACT

A method for operating a transmitting device using semi-orthogonal multiple access (SOMA) includes determining power allocations and sub-quadrature amplitude modulation (sub-QAM) allocations for a first receiving device and a second receiving device in accordance with channel information associated with the first receiving device and the second receiving device, and transmitting information about a first power allocation for the first receiving device, and a first sub-QAM allocation for the first receiving device to the first receiving device.

44 Claims, 17 Drawing Sheets

(51) Int. Cl.
  *H04L 27/06* (2006.01)
  *H04L 5/04* (2006.01)
  *H04L 5/12* (2006.01)
  *H04L 27/34* (2006.01)
  *H04L 5/00* (2006.01)
  *H04L 27/00* (2006.01)

(52) U.S. Cl.
  CPC .......... *H04L 27/0008* (2013.01); *H04L 27/34* (2013.01); *H04L 27/3488* (2013.01); *H04L 27/04* (2013.01); *H04L 27/06* (2013.01)

(56) References Cited

U.S. PATENT DOCUMENTS

| | | | | |
|---|---|---|---|---|
| 7,764,733 | B1* | 7/2010 | Cheong | H04L 25/0307 375/235 |
| 8,325,857 | B2 | 12/2012 | Jia et al. | |
| 8,446,892 | B2* | 5/2013 | Ji | H04J 11/005 370/329 |
| 8,837,274 | B2* | 9/2014 | Mueck | H04L 1/0625 370/209 |
| 2008/0137765 | A1* | 6/2008 | Dalla Torre | H04L 25/03006 375/261 |
| 2008/0159186 | A1 | 7/2008 | Steer | |
| 2010/0146141 | A1* | 6/2010 | Lim | H04H 20/42 709/231 |
| 2010/0202561 | A1* | 8/2010 | Gorokhov | H04L 27/0008 375/295 |
| 2010/0225752 | A1* | 9/2010 | Bench | H04L 27/3455 348/61 |
| 2010/0278284 | A1* | 11/2010 | Abrishamkar | H04B 1/7107 375/320 |
| 2010/0315970 | A1* | 12/2010 | Ramamurthi | H04B 7/0619 370/252 |
| 2011/0007853 | A1* | 1/2011 | Huang | H04L 25/03242 375/341 |
| 2012/0147831 | A1* | 6/2012 | Golitschek | 370/329 |
| 2012/0314786 | A1 | 12/2012 | Atungsiri et al. | |
| 2013/0070874 | A1* | 3/2013 | Nakagawa | H04B 7/10 375/323 |
| 2013/0107849 | A1* | 5/2013 | Park | H04B 7/0417 370/329 |
| 2013/0287142 | A1* | 10/2013 | Fimoff | H04L 1/0054 375/298 |
| 2014/0003546 | A1* | 1/2014 | Rosenhouse | H04L 27/38 375/262 |
| 2014/0169490 | A1* | 6/2014 | Medbo | H04W 52/241 375/267 |
| 2015/0126236 | A1* | 5/2015 | Mukherjee | H04B 7/0417 455/522 |
| 2015/0139177 | A1* | 5/2015 | Li | H04W 72/044 370/330 |
| 2015/0237644 | A1* | 8/2015 | Golitschek Edler von Elbwart | H04W 72/12 370/329 |

FOREIGN PATENT DOCUMENTS

| | | |
|---|---|---|
| WO | 2007089110 A2 | 8/2007 |
| WO | 2008154506 A1 | 12/2008 |

OTHER PUBLICATIONS

Hossain et al., "Rate Adaptive Hierarchical Modulation-Assisted Two-User Opportunistic Scheduling," IEEE Transactions on Wireless Communications, vol. 6, No. 6, Jun. 2007, total 10 pages.

* cited by examiner

SYSTEM AND METHOD FOR SEMI-ORTHOGONAL MULTIPLE ACCESS

This application claims the benefit of U.S. Provisional Application No. 62/044,061, filed on Aug. 29, 2014, entitled "System and Apparatus for Power and Modulation Division Multiple Access," which application is hereby incorporated herein by reference.

TECHNICAL FIELD

The present invention relates to digital communications, and, in particular embodiments, to system and method for semi-orthogonal multiple access (SOMA).

BACKGROUND

A common goal of successive generation of radio frequency communications systems is to increase the amount of information transmitted in a given communications band. As an example, NTT Docomo has proposed Non-Orthogonal Multiple Access (NOMA) as a candidate for a Fifth Generation (5G) radio access technology. NOMA combines power optimization on a per user equipment (UE) basis and superposition coding. A detailed description of NOMA is provided in document Saito, et al, "Non-Orthogonal Multiple Access (NOMA) for Cellular Future Radio Access," VTC '13, June 2013, which is hereby incorporated herein by reference.

SUMMARY

Example embodiments of the present disclosure which provide a system and method for semi-orthogonal multiple access (SOMA).

In accordance with an example embodiment of the present disclosure, a method for operating a transmitting device using semi-orthogonal multiple access (SOMA) is provided. The method includes determining, by the transmitting device, power allocations, sub-quadrature amplitude modulation (sub-QAM) allocations, and coding rates for a first receiving device and a second receiving device in accordance with channel information associated with the first receiving device and the second receiving device, and transmitting, by the transmitting device, information about a first power allocation for the first receiving device, and a first sub-QAM allocation for the first receiving device to the first receiving device.

In accordance with another example embodiment of the present disclosure, a method for operating a first receiving device operating in a semi-orthogonal multiple access (SOMA) communications system is provided. The method includes determining, by the first receiving device, power allocations, sub-quadrature amplitude modulation (sub-QAM) allocations, and coding rates of the first receiving device and a second receiving device, wherein one of the first receiving device and a second receiving device has a higher signal to noise ratio (SNR) channel with a transmitting device than the other one of the first receiving device and the second receiving device, and receiving, by the first receiving device, a QAM symbol. The method also comprises demapping, by the first receiving device, the QAM symbol in accordance with the sub-QAM allocation of the first receiving device, thereby producing encoded data, decoding, by the first receiving device, the encoded data in accordance with the coding rate of the first receiving device, thereby producing decoded data, and processing, by the first receiving device, the decoded data.

In accordance with another example embodiment of the present disclosure, a method for operating a second receiving device operating in a semi-orthogonal multiple access (SOMA) communications system is provided. The method includes determining, by the second receiving device, a constellation map of a first receiving device and the second receiving device, wherein a first channel between a transmitting device and the first receiving device is a high signal to noise ratio (SNR) channel and a second channel between the transmitting device and the second receiving device is a low SNR channel, and receiving, by the second receiving device, a QAM symbol. The method also includes demapping, by the second receiving device, the QAM symbol in accordance with the constellation map, thereby producing encoded data, decoding, by the second receiving device, the encoded data in accordance with a coding rate of the second receiving device, thereby producing decoded data, and processing, by the second receiving device, the decoded data.

In accordance with another example embodiment of the present disclosure, a transmitting device is provided. The transmitting device includes a processor, and a transmitter operatively coupled to the processor. The processor determines power allocations and sub-quadrature amplitude modulation (sub-QAM) allocations for a first receiving device and a second receiving device in accordance with channel information associated with the first receiving device and the second receiving device. The transmitter transmits information about a first power allocation for the first receiving device, and a first sub-QAM allocation for the first receiving device to the first receiving device.

One advantage of an embodiment is that decoding requirements are simple and leverages interference structure for communicating devices operating in a low signal to noise ratio environment.

A further advantage of an embodiment is that a uniform control signaling format is utilized for all communicating devices, thereby simplifying control signaling.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

The present disclosure will be described with respect to example embodiments in a specific context, namely communications systems that use advanced multiple access techniques to improve performance for communicating devices while maintaining a uniform level of control information across communicating devices and reducing decoding complexity. The disclosure may be applied to standards compliant communications systems, such as those that are compliant with Third Generation Partnership Project (3GPP), IEEE 802.11, and the like, technical standards, and non-standards compliant communications systems, that use advanced multiple access techniques.

Figure 1:
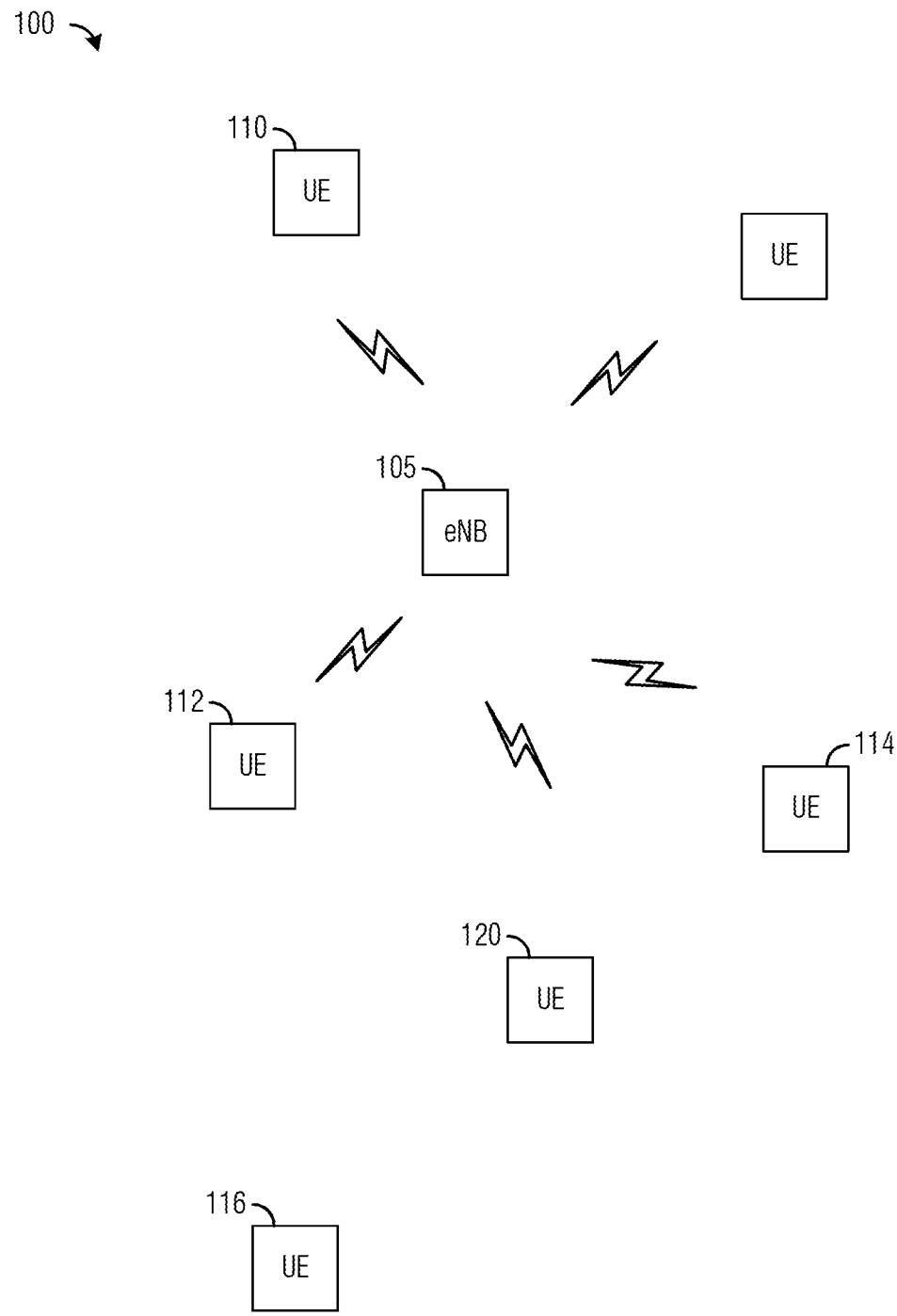
FIG. 1 illustrates an example communications system according to example embodiments described herein.

FIG. 1 illustrates an example communications system 100. Communications system 100 includes an evolved NodeB (eNB) 105 that may serve a plurality of UE, such as UE 110, UE 112, UE 114, UE 116, and UE 120. eNB 105 may schedule transmission opportunities for the UEs and signal information regarding the transmission opportunities to the UEs. Based on the type of the transmission opportunity, the UEs may receive transmissions or make transmissions in accordance with the scheduled transmission opportunities. eNB 105, as well as a subset of the UEs, may implement example embodiments presented herein, namely, power and modulation domain multiple access, also known as semi-orthogonal multiple access (SOMA).

In general, eNBs may also be referred to as base stations, NodeBs, controllers, base terminal stations, access points, and the like. Similarly, UEs may also be referred to as mobile stations, mobiles, terminals, users, subscribers, and the like. While it is understood that communications systems may employ multiple eNBs capable of communicating with a number of UEs, only one eNB, and a number of UEs are illustrated for simplicity.

Figure 2A:
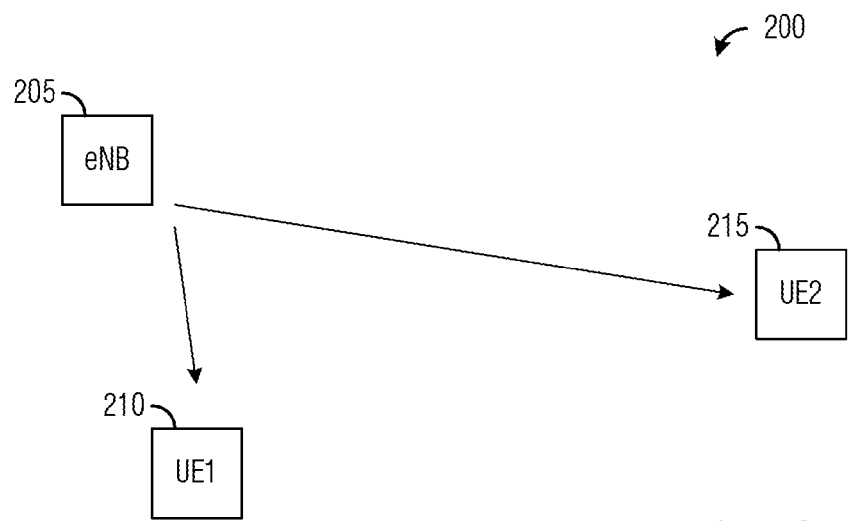
FIG. 2a illustrates an example communications system highlighting an arrangement of UEs according to example embodiments described herein.

FIG. 2a illustrates an example communications system 200 highlighting an arrangement of UEs. Communications system 200 includes an eNB 205 serving a plurality of UEs, including UE1 210 and UE2 215. The UEs may also be referred to as receiving devices. UE1 210 may be located in close proximity to eNB 205 and may have a high signal to noise ratio (SNR), e.g., 20 dB, while UE2 215 may be remotely located with respect to eNB 205 and may have a low SNR, e.g., 0 dB. It is noted that proximity, i.e., separation, between eNB and UE is not the only factor in channel quality (low SNR vs high SNR). Although the discussion presented herein focuses on 2 UEs (the high SNR UE and the low SNR UE), the example embodiments presented herein are operable with any number of UEs greater than 1.

Figure 2B:
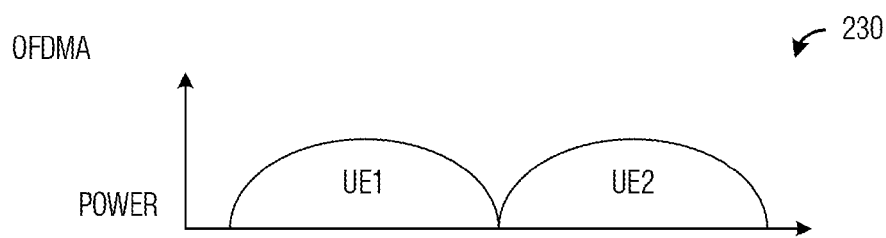
FIG. 2b illustrates an example bandwidth and data rate allocation for communications system in an orthogonal frequency division multiple access (OFDMA) communications system.

FIG. 2b illustrates an example bandwidth and data rate allocation 230 for communications system 200 in an orthogonal frequency division multiple access (OFDMA) communications system. As shown in FIG. 2b, both UE1 210 and UE2 215 may be assigned approximately ½ of the bandwidth. However, since the communications channel for UE1 210 is of significantly better quality, the data rate for UE1 210 is significantly higher than the data rate for UE2 215 (3.33 bps/HZ compared to 0.50 bps/HZ, for example).

Figure 2C:
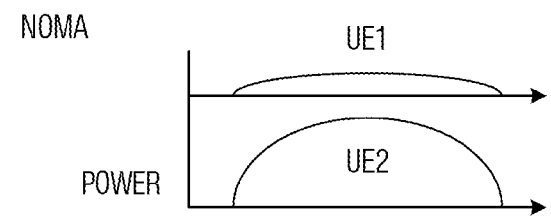
FIG. 2c illustrates an example bandwidth and data rate allocation for communications system in a NOMA communications system.

FIG. 2c illustrates an example bandwidth and data rate allocation 260 for communications system 200 in a NOMA communications system. In NOMA, both UEs are allocated the same bandwidth but with different power levels. UE1 210 is assigned ⅕ of the available transmit power and UE2 215 is assigned ⅘ of the available transmit power. The data rate for UE1 210 is 4.39 bps/HZ and the data rate for UE2

215 is 0.74 bps/HZ, for example, both of which are higher than in the OFDMA communications system. NOMA may also utilize different time resources for different UEs, with a first slot being assigned to UE1 and a second slot being assigned to UE2.

In NOMA, the decoding of the signal for UE1 210 involves UE1 210 receiving a signal that includes both a signal intended for UE1 210 and a signal intended for UE2 215, decoding of the signal intended for UE2 215, which may then be used to cancel interference due to the signal for UE2 215 from the received signal, and then decoding the interference cancelled signal to obtain the information intended for UE1 210. Therefore, UE1 210 needs to have knowledge of the modulation and coding set (MCS) assigned to UE2 215 in order to decode the signal intended for UE2 215. Success in decoding the signal intended for UE1 210 is dependent on the ability to decode the signal intended for UE2 215.

On the other hand, the decoding of the signal for UE2 215 involves UE2 215 receiving a signal that includes both a signal intended for UE1 210 and a signal intended for UE2 215, and decoding the received signal as the signal intended for UE2 215 while treating the signal intended for UE1 210 as noise. Since the signal intended for UE1 210 typically does not have a Gaussian distribution, degradation in decoding performance may be observed.

As shown above, power domain optimization helps to improve the capacity of communications channels between an eNB and two or more UEs. Power domain optimization may make use of channel condition, such as channel quality indicators (CQI), channel state information (CSI), and the like, reported by the UEs.

In Modulation Domain Multiple Access (MDMA), hierarchical modulation is used to simultaneously transmit information on different modulation layers. Each of the different modulation layers may be assigned to a different UE or multiple modulation layers may be assigned to a single UE. Different Gray code distances may be assigned to different modulation layers, thereby providing different levels of protection or reliability for different modulation layers. As an illustrative example, a modulation layer with small reliability may be assigned to a UE with high SNR since higher data rates may be achieved with high probability of successful decoding, while a modulation layer with large reliability may be assigned to a UE with low SNR since successful decoding is preferred over high data rate. MDMA is described in detail in U.S. Pat. No. 8,325,857, issued Dec. 4, 2012, which is hereby incorporated herein by reference.

According to an example embodiment, power domain optimization (or similarly, power allocation) and MDMA are combined to produce a multiple access radio technology that offers improved capacity of communications channels and un-equal protection of data for different UEs. The combination is referred to as power and modulation division multiple access (PMDMA). Power domain optimization provides improved capacity of communications channels, while MDMA offers un-equal protection of data for different UEs. PMDMA decoding does not involve one UE having to decode the data of another UE. However, PMDMA allows the structure of interference from one UE to be used to improve the decoding performance at another UE. It is noted that PMDMA may also be referred to as semi-orthogonal multiple access (SOMA), since for some UEs (i.e., the high SNR UEs), the signal for the low SNR UEs may be considered as being no interference, and hence, orthogonal to the signal for the high SNR UEs. In the case of the low SNR UEs, the signal for the high SNR UEs is treated as interference to the signal for the low SNR UEs, and hence, non-orthogonal.

According to an example embodiment, the QAM constellation used in PMDMA is jointly mapped for UEs involved in the transmissions. The joint mapping of the QAM constellation for the UEs may enable UEs having high quality communications channels to decode signals intended for it without having to decode the signals intended for UEs with low quality communications channels. The signals intended for UEs with low quality communications channels may be considered to be orthogonal to the signals intended for UEs with high quality communications channels. Not having to decode signals intended for other UEs enable a reduction in processing complexity, as well as a reduction in signaling overhead.

Figure 3:
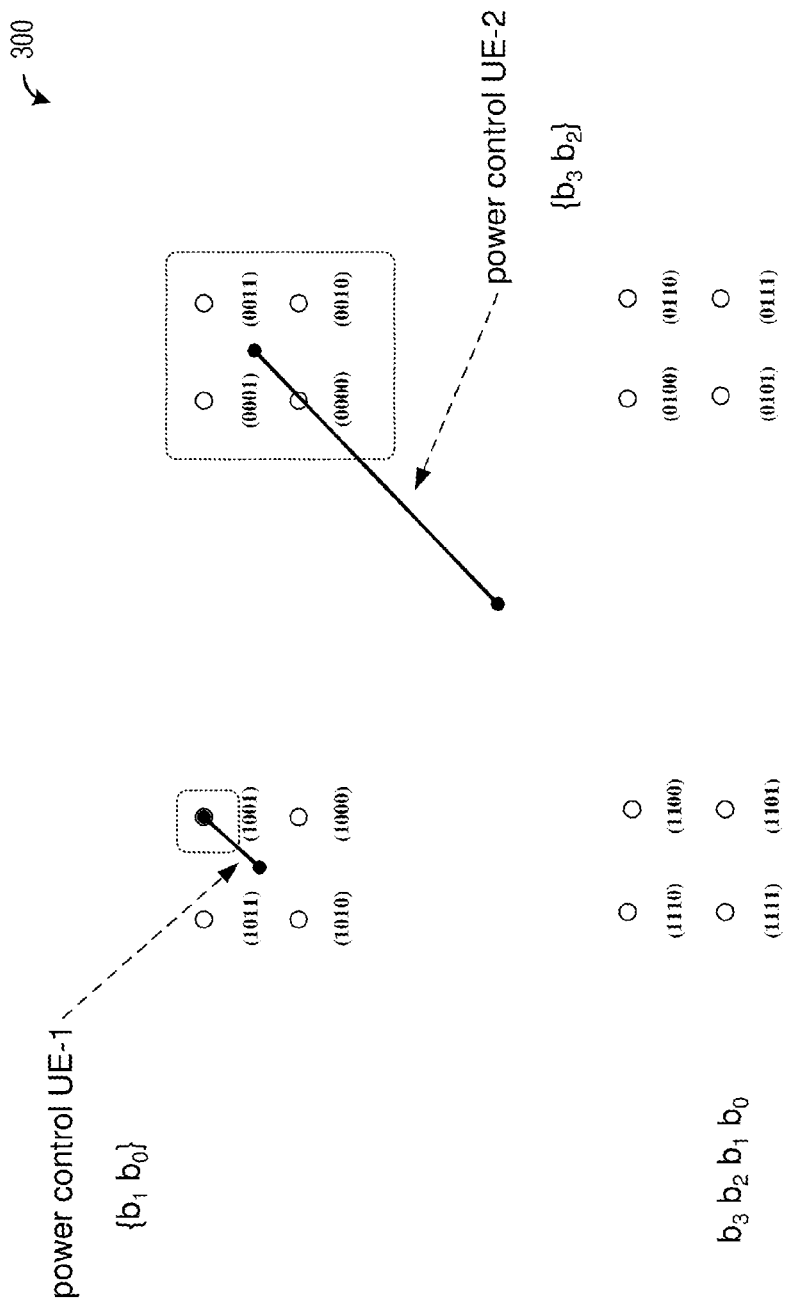
FIG. 3 illustrates a first example PMDMA (or SOMA) constellation according to example embodiments described herein.

FIG. 3 illustrates a first example PMDMA (or SOMA) constellation 300. PMDMA constellation 300 is a 4-bit 16-QAM constellation. The 4 bits may be labeled b3 b2 b1 b0, with bits b1 b0 being assigned to UE1 and bits b3 b2 being assigned to UE2. For discussion purposes, consider a communications system as described in FIG. 2a, where UE1 and an eNB share a high SNR communications channel and UE2 and the eNB share a low SNR communications channel. Since the communications channel between UE1 and the eNB is a high quality channel, a low reliability QAM layer (comprising bits b1 b0) may be assigned to modulate data transmitted on the communications channel since successful decoding probability is high and unneeded reliability is traded for higher data rates. A QAM layer comprises two bits of the same Log-Likelihood Ratio (LLR) properties. Conversely, the communications channel between UE2 and the eNB is a low quality channel. Hence, a high reliability QAM layer (comprising bits b3 b2) may be assigned to modulate data transmitted on the communications channel to trade-off data rate for improved decoding probability. The power control appears in PMDMA constellation 300 as a distance between an origin of a sub-constellation to a constellation point. For UE1, the power control may be based on an averaged power for the sub-constellation, with an origin for the sub-constellation being in the middle of the sub-constellation. For UE2, the power control may be based on an averaged power for the QAM constellation from an origin of the QAM constellation to the center of each sub-constellation. A ratio of the average power for the two UEs may be referred to as a rower offset.

$$\text{Power\_Offset} = \text{power\_low\_SNR\_UE:power\_high\_SNR\_UE}$$
$$= \text{power\_UE2:power\_UE1},$$

and is often expressed in dB.

Figure 4:
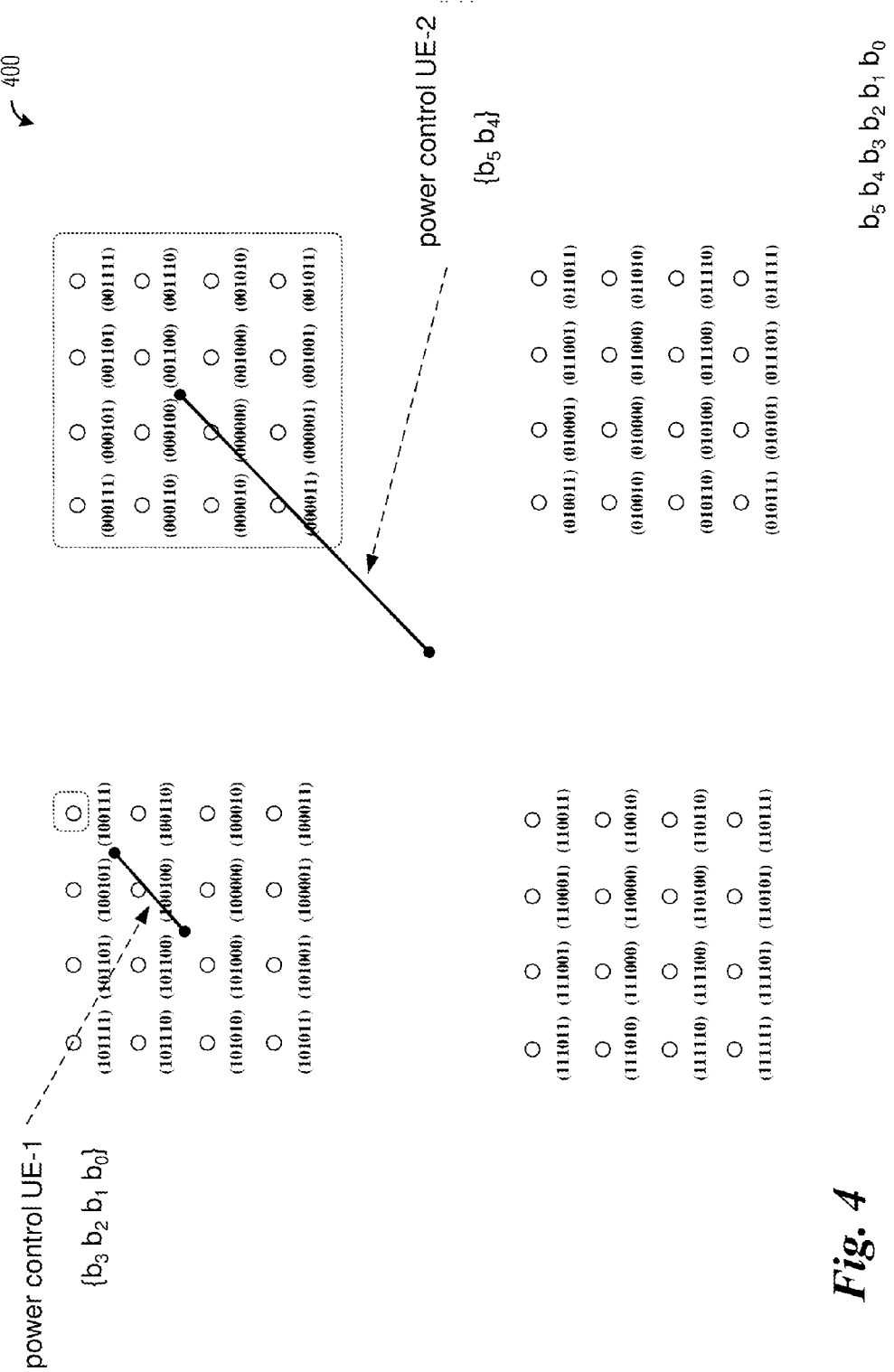
FIG. 4 illustrates a second example PMDMA (or SOMA) constellation according to example embodiments described herein.

FIG. 4 illustrates a second example PMDMA (or SOMA) constellation 400. PMDMA constellation 400 is a 6-bit 64-QAM constellation. The 6 bits may be labeled b5 b4 b3 b2 b1 b0, with bits b3 b2 b1 b0 being assigned to UE1 and bits b5 b4 being assigned to UE2. For discussion purposes, consider a communications system as described in FIG. 2a, where UE1 and an eNB share a high SNR communications channel and UE2 and the eNB share a low SNR communications channel. Since the communications channel between UE1 and the eNB is a high quality channel, low reliability QAM layers (comprising bits b3 b2 b1 b0) may be assigned to modulate data transmitted on the communications channel since successful decoding probability is high and unneeded reliability is traded for higher data rates. Conversely, the communications channel between UE2 and the eNB is a low quality channel. Hence, a high reliability QAM layer (comprising bits b5 b4) may be assigned to modulate data transmitted on the communications channel to trade-off data rate for improved decoding probability. The power control appears in PMDMA constellation 400 as a distance between an origin of a sub-constellation to a constellation point. For UE1, the power control may be based on an averaged power for the sub-constellation (a 16-QAM constellation), with an origin for the sub-constellation being in the middle of the sub-constellation. For UE2, the power control may be based on an averaged power for the QAM constellation from an origin of the QAM constellation to the center of each 16-QAM constellation.

Figure 5:
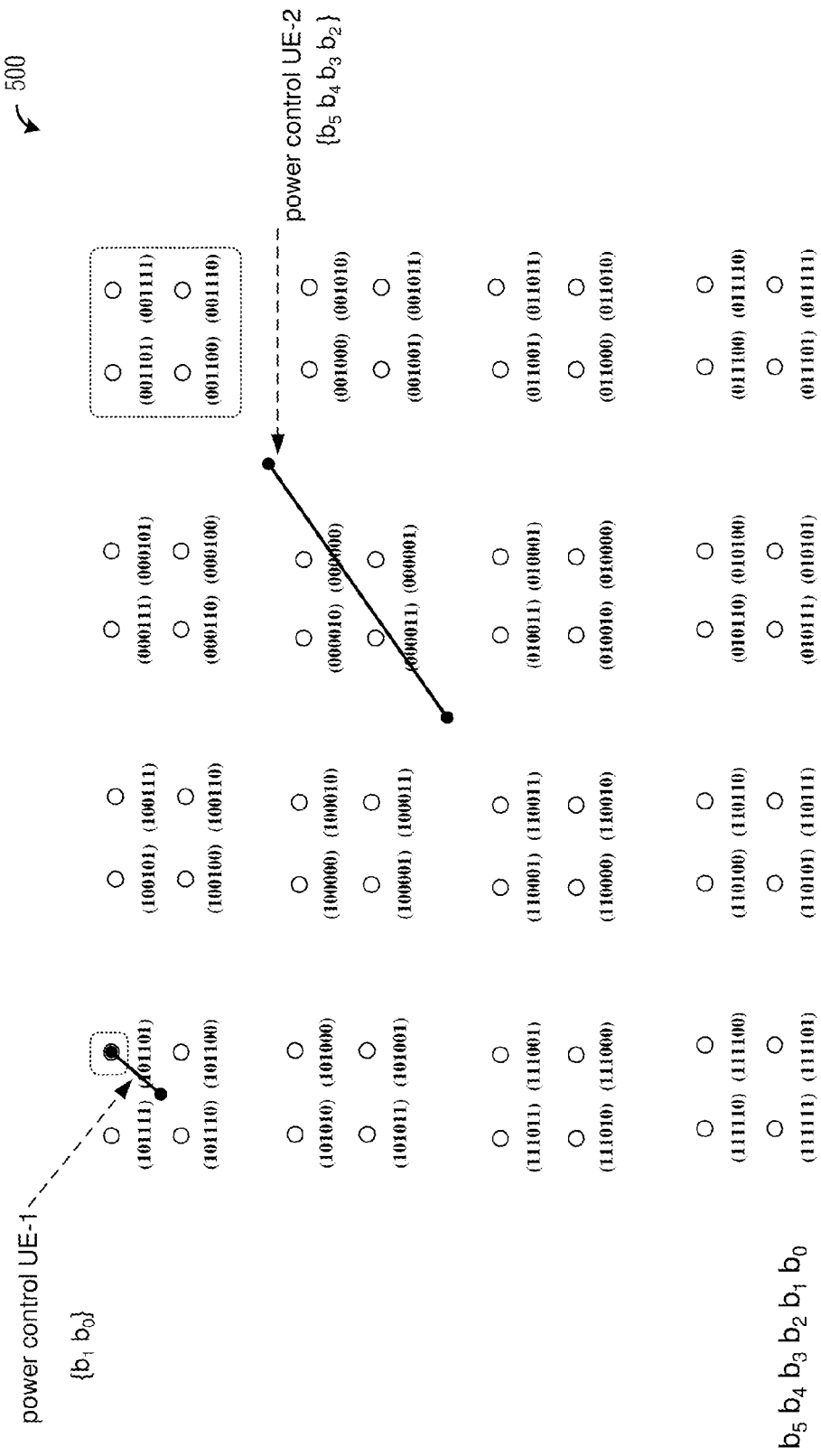
FIG. 5 illustrates a third example PMDMA (or SOMA) constellation according to example embodiments described herein.

FIG. 5 illustrates a third example PMDMA (or SOMA) constellation 500. PMDMA constellation 500 is a 6-bit 64-QAM constellation. The 6 bits may be labeled b5 b4 b3 b2 b1 b0, with bits b1 b0 associated with a first QAM layer being assigned to UE1 and bits b5 b4 b3 b2 associated with a second and third QAM layer being assigned to UE2. For discussion purposes, consider a communications system as described in FIG. 2a, where UE1 and an eNB share a high SNR communications channel and UE2 and the eNB share a low SNR communications channel. Since the communications channel between UE1 and the eNB is a high quality channel, a low reliability QAM layer (comprising bits b1 b0) may be assigned to modulate data transmitted on the communications channel since successful decoding probability is high and unneeded reliability is traded for higher data rates. Conversely, the communications channel between UE2 and the eNB is a low quality channel. Hence, high reliability QAM layers (comprising bits b5 b4 b3 b2) may be assigned to modulate data transmitted on the communications channel to trade-off data rate for improved decoding probability. The power control appears in PMDMA constellation 500 as a distance between an origin of a sub-constellation to a constellation point.

Although FIGS. 3-5 illustrate several example PMDMA constellations with 4-bits and 6-bits, PMDMA constellation may be any even number of bits, such as 2, 4, 6, 8, and the like. Similarly, FIGS. 3-5 illustrate the PMDMA constellations being partitioned into multiple QAM layers. In practice, the PMDMA constellations may be partitioned into 2 or more sub-QAMs, wherein QAM layers are examples of sub-QAMs with each QAM layer being associated with 2 bits, depending on the number of UEs being served, for example. Furthermore, the number of bits assigned to each sub-QAM (e.g., QAM layer) may be the same or different. As an illustrative example, a QAM layer comprises two bits of the same LLR properties. As an illustrative example, a PMDMA constellation of 6-bits may be partitioned into 3 QAM layers, with 2 bits being assigned to a first QAM layer, 2 bits being assigned to a second QAM layer, and 2 bits being assigned to a third QAM layer. In this example, each QAM layer is a sub-QAM, however, a sub-QAM may include 1 or more QAM layers. As discussed previously, a UE may be assigned at least one QAM layer. A maximum number of UEs per constellation map may be achieved when each UE is assigned one QAM layer, i.e., the maximum number of UEs per constellation map is equal to the number of QAM layers in the constellation map. Therefore, the illustrative examples of 4-bit and 6-bit PMDMA constellations being partitioned into 2 and 3 QAM layers should not be construed as being limiting to either the scope or the spirit of the example embodiments.

According to an example embodiment, the UEs do not need to decode transmissions of other UEs, therefore, successive interference cancellation (SIC) is not needed in the decoding process. As an illustrative example, consider the communications system as shown in FIG. 2a, decoding by UE1 does not need to decode transmissions of UE2. Furthermore, the UEs may perform accurate QAM soft de-mapping since interference from other UEs are structured. As another illustrative example, consider the communications system as shown in FIG. 2a, UE2 can perform accurate QAM soft de-mapping since interference from transmissions to UE1 is structured.

According to an example embodiment, a shared demodulation reference signal (DMRS) may be used for channel estimation. The shared DMRS may be designed for UE2 (i.e., the UE with the lower quality channel). According to another example embodiment, the power offset (or the power allocation) for UE1 (i.e., the UE with the higher quality channel) is provided to the UEs. The power offset may also be used by UE2 to improve its QAM de-mapping performance. Since the power offsets are already signaled to the UEs, no additional signaling is needed. According to another example embodiment, the control information is more uniform for both UEs, with the control information comprising the power offset of UE1 and the MCS and QAM layer of each UE. The power offset (or the power allocation) may be explicitly signaled to the UEs. Alternatively, the power offset (or the power allocation) may be implicitly signaled to the UEs. Examples of explicit signaling and implicit signaling are provided below. Hence, the discussion of power offset (or power allocation) signaling may refer to either explicit or implicit signaling.

Figure 6:
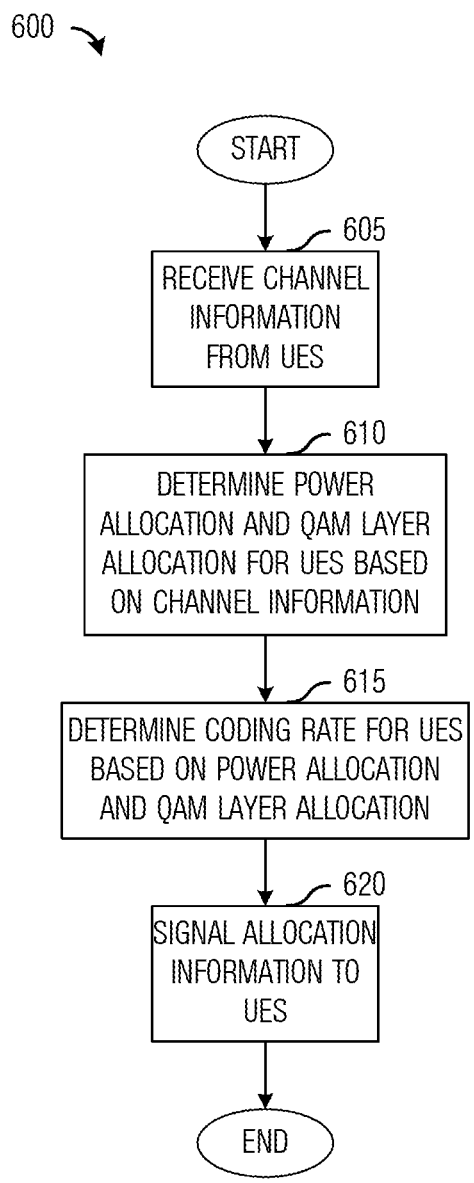
FIG. 6 illustrates a flow diagram of example operations occurring in a transmitting device as the transmitting device adjusts PMDMA (or SOMA) configuration according to example embodiments described herein.

FIG. 6 illustrates a flow diagram of example operations 600 occurring in a transmitting device as the transmitting device adjusts PMDMA configuration. Operations 600 may be indicative of operations occurring in a transmitting device as the transmitting device adjusts PMDMA configuration. The transmitting device may be an eNB, for example.

Operations 600 may begin with the transmitting device receiving channel information from UEs (block 605). The channel information may be in the form of CQI, CSI, or other information related to channel quality, channel condition, and the like. The transmitting device may determine a power allocation and a QAM layer allocation for a subset of the UEs reporting channel information (block 610). As an illustrative example, the transmitting device may select a UE with a high quality channel (such as UE1 of FIG. 2a) and a UE with a low quality channel (such as UE2 of FIG. 2a) and determine a power allocation and a QAM layer allocation for the UEs. Alternatively, the transmitting device may select more than 2 UEs. The transmitting device may determine a coding rate for the subset of the UEs reporting channel information (block 615).

After the power allocation and the QAM layer assignment, the transmitting device may know the effective CQI of the subset of the UEs (which have been derived from the channel information reported by the UEs). The transmitting device may determine the coding rate from the effective CQI. A coding rate may be determined for each of the UEs of the subset. The coding rate may be the same or different for each of the UEs. The coding rate may be determined in accordance with the power allocation and the QAM layer allocation. The transmitting device may signal information about the power allocation, the QAM layer allocation, and the coding rate to the UEs (block 620). The information may be broadcast or unicast to the UEs. The information may be transmitted using higher layer signaling (such as radio resource control (RRC) signaling, for example). The power allocation (or the power offset) may be explicitly signaled. Alternatively, the power allocation (or the power offset) may be implicitly signaled. As an illustrative example, the power offset may be derived from a QAM constellation assigned to the UEs. An example of deriving the power offset from the QAM constellation is provided below.

Operations 600 may occur whenever the transmitting device receives updated channel information, when the transmitting device changes the selection of UEs, whenever UEs exit or enter the communications system, and the like.

Figure 7:
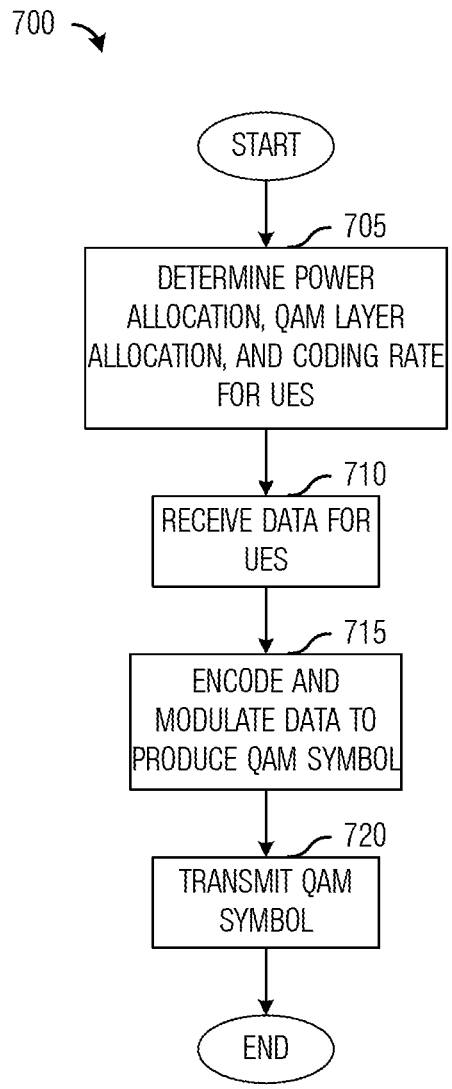
FIG. 7 illustrates a flow diagram of example operations occurring in a transmitting device as the transmitting device transmits using PMDMA (or SOMA) according to example embodiments described herein.

FIG. 7 illustrates a flow diagram of example operations 700 occurring in a transmitting device as the transmitting device transmits using PMDMA. Operations 700 may be indicative of operations occurring in a transmitting device as the transmitting device transmits using PMDMA. The transmitting device may be an eNB, for example.

Operations 700 may begin with the transmitting device determining information about a power allocation, QAM layer allocation, and coding rate for UEs (block 705). The information may be retrieved from memory (local or remote), storage (local or remote), database (local or remote), controlling entity (local or remote, and the like. The transmitting device may receive data for the UEs (block 710). The transmitting device may encode and modulate the data for each UE separately using the QAM layer allocation and the coding rate of each UE to produce a QAM symbol (block 715). The transmitting device may transmit the QAM symbol (block 720).

Figure 8:
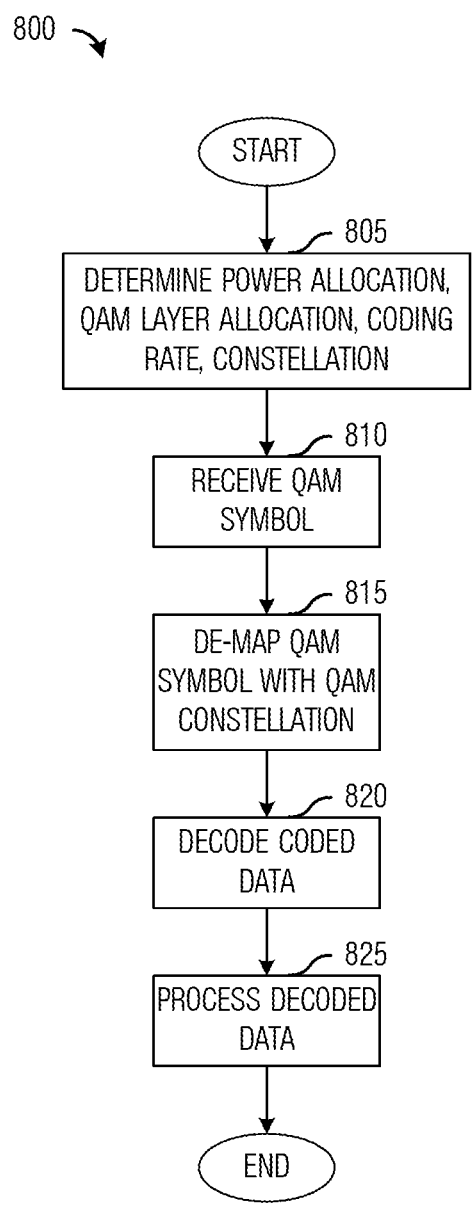
FIG. 8 illustrates a flow diagram of example operations occurring in a receiving device decoding a received signal that is transmitted using PMDMA (or SOMA), where the receiving device has a high quality communications channel with a transmitting device, such as UE1 of FIG. 2a according to example embodiments described herein.

FIG. 8 illustrates a flow diagram of example operations 800 occurring in a receiving device decoding a received signal that is transmitted using PMDMA, where the receiving device has a high quality communications channel with a transmitting device, such as UE1 of FIG. 2a. Operations 800 may be indicative of operations occurring in a receiving device as the UE decodes a received signal transmitted using PMDMA, where the UE has a high quality communications channel with a transmitting device. The receiving device may be a UE, for example.

Operations 800 may begin with the receiving device determining information about a power allocation, QAM layer allocation, coding rate, and QAM constellation for itself (block 805). As an example, the QAM constellation may be generated in accordance with a stored base constellation and modified with the power allocation. The QAM layer allocation may specify which bits are assigned to the receiving device. The information may be retrieved from a received message, memory (local or remote), storage (local or remote), database (local or remote), controlling entity (local or remote), and the like. The power allocation (or the power offset) may be signaled to the receiving device explicitly. Alternatively, the power allocation (or the power offset) may be implicitly signaled to the UE. As an illustrative example, the receiving device may be signaled a QAM constellation and the receiving device may be able to derive the power allocation (or the power offset) from the QAM constellation. An example of deriving the power offset from the QAM constellation is provided below. The receiving device may receive a QAM symbol (block 810). The receiving device may de-map the QAM symbol using the QAM constellation, producing encoded data (block 815). The receiving device may decode the encoded data (block 820). The receiving device may process the decoded data (block 825).

Figure 9:
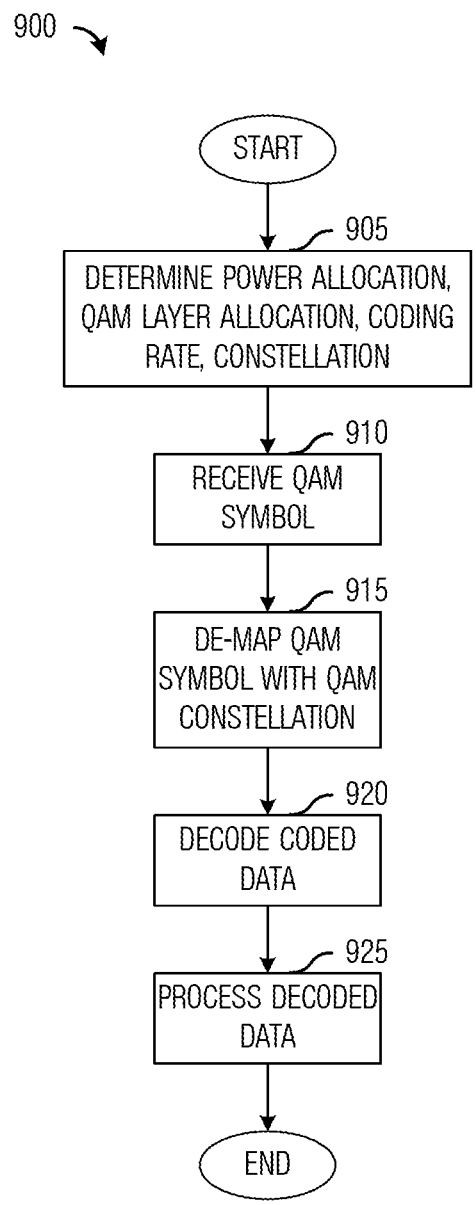
FIG. 9 illustrates a flow diagram of example operations occurring in a receiving device decoding a received signal that is transmitted using PMDMA (or SOMA), where the receiving device has a low quality communications channel with a transmitting device, such as UE2 of FIG. 2a according to example embodiments described herein.

FIG. 9 illustrates a flow diagram of example operations 900 occurring in a receiving device decoding a received signal that is transmitted using PMDMA, where the receiving device has a low quality communications channel with a transmitting device, such as UE2 of FIG. 2a. Operations 900 may be indicative of operations occurring in a receiving device as the receiving device decodes a received signal transmitted using PMDMA, where the receiving device has a low quality communications channel with a transmitting device. The receiving device may be a UE, for example.

Operations 900 may begin with the receiving device determining information about a power allocation, QAM layer allocation, coding rate, and QAM constellation for itself (block 905). As an example, the QAM constellation may be generated in accordance with a stored base constellation and modified with the power allocation. The QAM layer allocation may specify which bits are assigned to the receiving device. The information may be retrieved from a received message, memory (local or remote), storage (local or remote), database (local or remote), controlling entity (local or remote), and the like. The power allocation (or the power offset) may be signaled to the receiving device explicitly. Alternatively, the power allocation (or the power offset) may be implicitly signaled to the receiving device. As an illustrative example, the receiving device may be signaled a QAM constellation and the receiving device may be able to derive the power allocation (or the power offset) from the QAM constellation. An example of deriving the power offset from the QAM constellation is provided below. The receiving device may receive a QAM symbol (block 910). The receiving device may de-map the QAM symbol using the QAM constellation (block 915). The receiving device may decode the encoded data (block 920). The receiving device may process the decoded data (block 925).

According to an example embodiment, in a situation wherein the UE having the low quality communications channel is a legacy UE, the UE may treat the signal for the UE with the high quality communications channel as noise. In such a situation, the legacy UE (e.g., the UE with the low quality communications channel) may not need to know the structure of the constellation used to support PMDMA (or SOMA). The legacy UE may not even need to know that it has been paired with another UE (e.g., the UE with the high quality communications channel) and that the UEs are being transmitted to at the same time. The signaling to the two UEs may be different to help reduce signaling overhead. As an illustrative example, consider a situation wherein the UE with the high quality communications channel is assigned a 16QAM sub-QAM and the UE with the low quality communications channel is assigned a QPSK sub-QAM. The UE with the high quality communications channel may need to know its power allocation, sub-QAM allocation, coding rate, and the like, while the UE with the low quality communications channel may only need to know its sub-QAM allocation. The signaling may be explicit, implicit, or a combination thereof.

According to an example embodiment, a first set of bits for a first UE may be mapped differently from a second set of bits for a second UE. The bits may follow a Gray coding principle. Due to this property, when decoding the first set of bits, it is not required to know the second set of bits.

Figure 10:
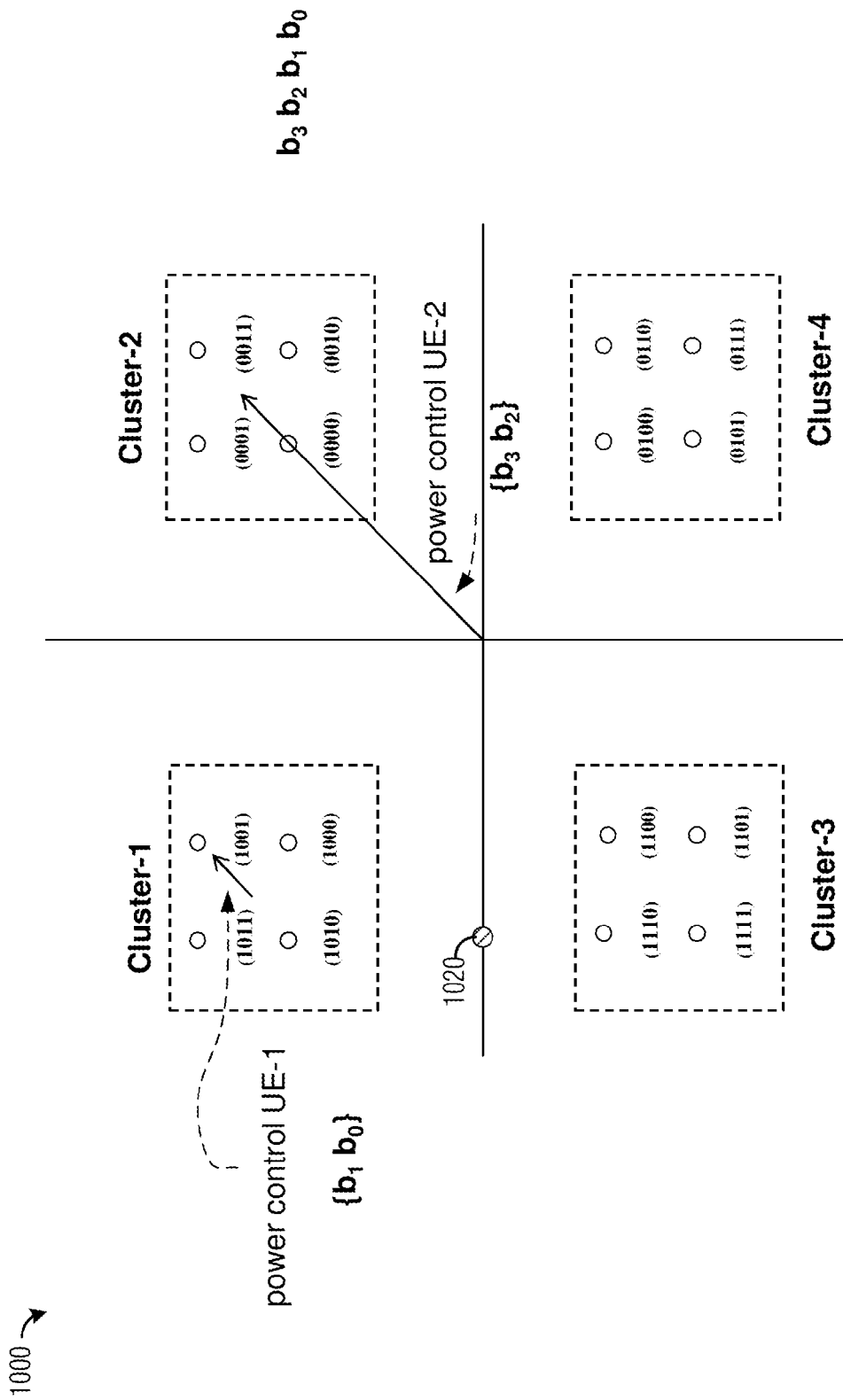
FIG. 10 illustrates a fourth example PMDMA (or SOMA) constellation according to example embodiments described herein.

FIG. 10 illustrates a fourth example PMDMA (or SOMA) constellation 1000 highlighting a symmetric nature of constellation points. As shown in FIG. 10, bits allocated to UE1 (i.e., bits b1 b0) are symmetric across the axes of PMDMA constellation 1000. As an illustrative example, constellation point 1010 and constellation point 1110 are symmetric across the horizontal axis, while constellation point 1011 and constellation point 0011 are symmetric across the vertical axis. The symmetry in constellation points allows UE1 to decode received QAM symbols while considering the signal for UE2 to be interference. As an illustrative example, consider a situation wherein UE1 receives a QAM symbol that maps to point 1020. Point 1020 is closest to either constellation point 1010 or constellation point 1110. Since bits b1 b0 are the same for either constellation point, UE1 does not need to have knowledge regarding the signal for UE2.

Figure 11:
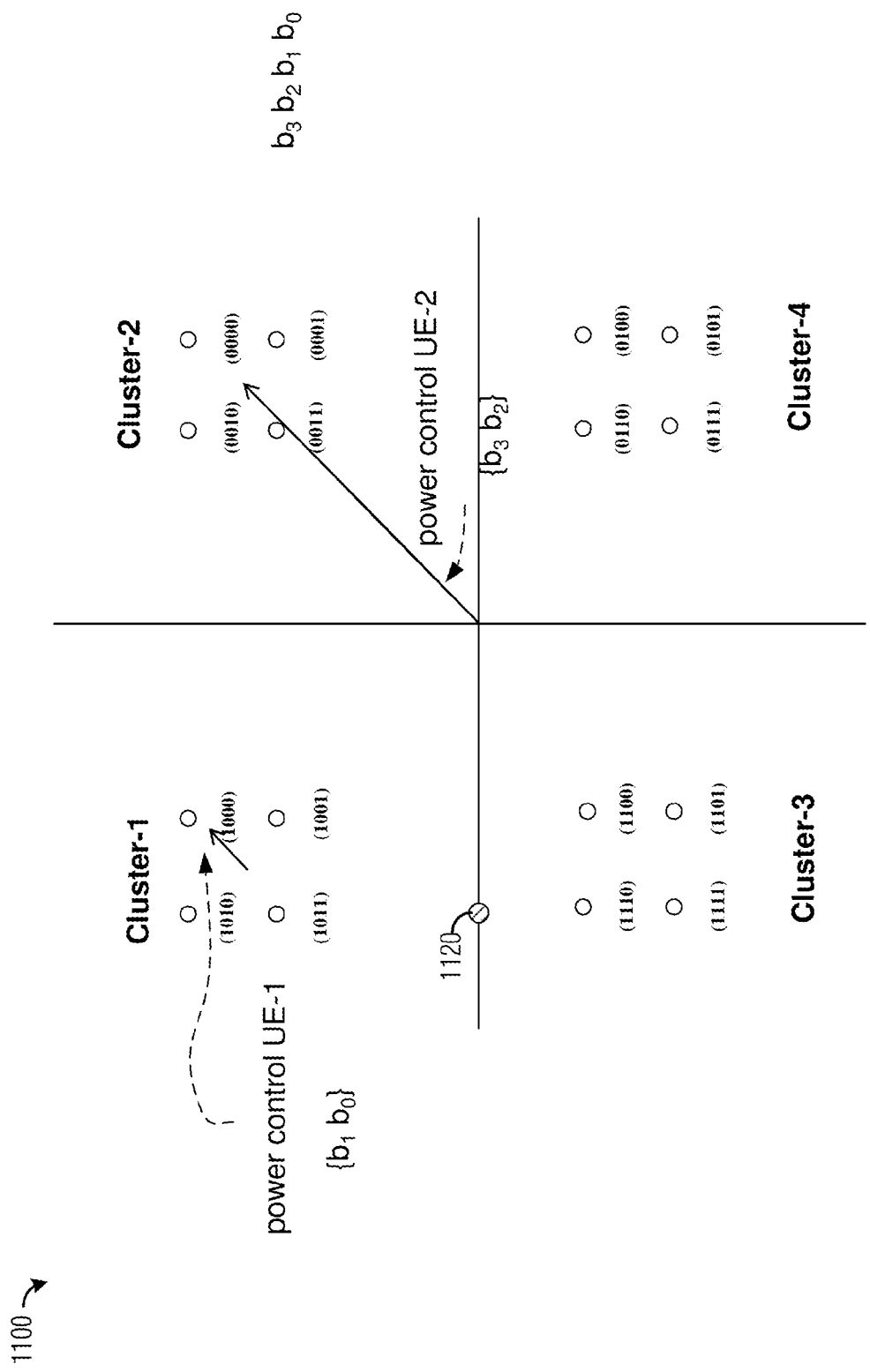
FIG. 11 illustrates an example NOMA constellation.

FIG. 11 illustrates an example NOMA constellation 1100. As shown in FIG. 11, bits allocated to UE1 (i.e., bits b1 b0) are asymmetric across the axes of NOMA constellation 1100. As an illustrative example, constellation point 1011 and constellation point 1110 are asymmetric across the horizontal axis, while constellation point 1010 and constellation point 0000 are asymmetric across the vertical axis. The asymmetry in does not allow UE1 to decode received QAM symbols without knowledge of the signal for UE2. As an illustrative example, consider a situation wherein UE1 receives a QAM symbol that maps to point 1120. Point 1120 is closest to either constellation point 1011 or constellation point 1110. Since bits b1 and b0 of the two constellation points are different, UE1 needs to know the value of the signal for UE2 (i.e., bits b3 b2) to determine the value of bits b1 b0.

According to an example embodiment, a power offset for UEs may be inherently included in a constellation map assigned to the UEs. A plurality of constellation maps may be defined, with different inherent power offsets, for example. The transmitting device may select one of the plurality of constellation maps in accordance with the power offset and send an indicator of the selected constellation map to the UEs. As an illustrative example, the transmitting device may select a constellation map out of the plurality of constellation maps with an inherent power offset that most closely matches the power offset. The transmitting device may transmit an index corresponding to the selected constellation map to the UEs. The UEs may be able to determine the power offset assigned to them by referencing the index received from the transmitting device to determine the selected constellation map and its inherent power offset.

Figures 12A, 12B:
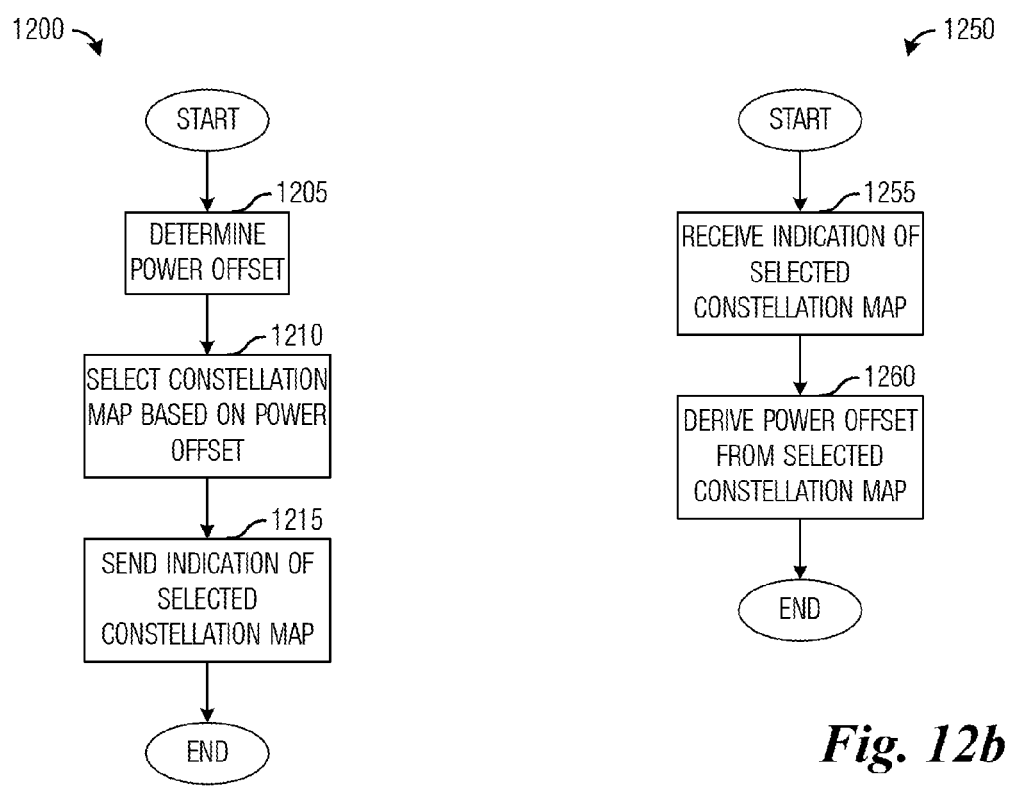
FIG. 12a illustrates a flow diagram of first example operations occurring in a transmitting device implicitly signaling a power offset to a receiving device according to example embodiments described herein.
FIG. 12b illustrates a flow diagram of first example operations occurring in a receiving device receiving implicit signaling of a power offset according to example embodiments described herein.

FIG. 12a illustrates a flow diagram of first example operations 1200 occurring in a transmitting device implicitly signaling a power offset to a receiving device. Operations 1200 may be indicative of operations occurring in a transmitting device as the transmitting device implicitly signals a power offset to a receiving device.

Operations 1200 may begin with the transmitting device determining a power offset for receiving devices (block 1205). The transmitting device may determine the power offset by jointly determining a first power allocation for a first receiving device with a high quality channel between itself and the transmitting device and a second power allocation for a second receiving device with a low quality channel between itself and the transmitting device. The power offset may be determined in accordance with channel information, such as CQI, CSI, and the like, reported by the first receiving device and the second receiving device. The transmitting device may select one of a plurality of constellation maps with an inherent power offset in accordance with the power offset (block 1210). As an illustrative example, the inherent power offset of the selected constellation map may be the closest to the power offset determined for the receiving devices. As another illustrative example, the inherent power offset of the selected constellation map may be the smallest inherent power offset greater than the power offset determined for the receiving devices. The transmitting device may send the indication of the selected constellation map to the receiving devices (block 1215). The transmitting device may also send other information to the receiving devices, including QAM layer allocation, coding rate, and the like.

FIG. 12b illustrates a flow diagram of first example operations 1250 occurring in a receiving device receiving implicit signaling of a power offset. Operations 1250 may be indicative of operations occurring in a receiving device as the receiving device receives implicit signaling of a power offset. The receiving device may be a UE, for example.

Operations 1250 may begin with the receiving device receiving an indication of a selected constellation map (block 1255). The receiving device may also receive other information from the transmitting device, including QAM layer allocation, coding rate, and the like. The receiving device may determine the inherent power offset of the selected constellation map as indicated (block 1260). From the selected constellation map, the receiving device may be able to determine the power offset since the receiving device is able to derive the power allocation for itself and for the other receiving device. The power offset may be derived from the power allocations.

Figure 13:
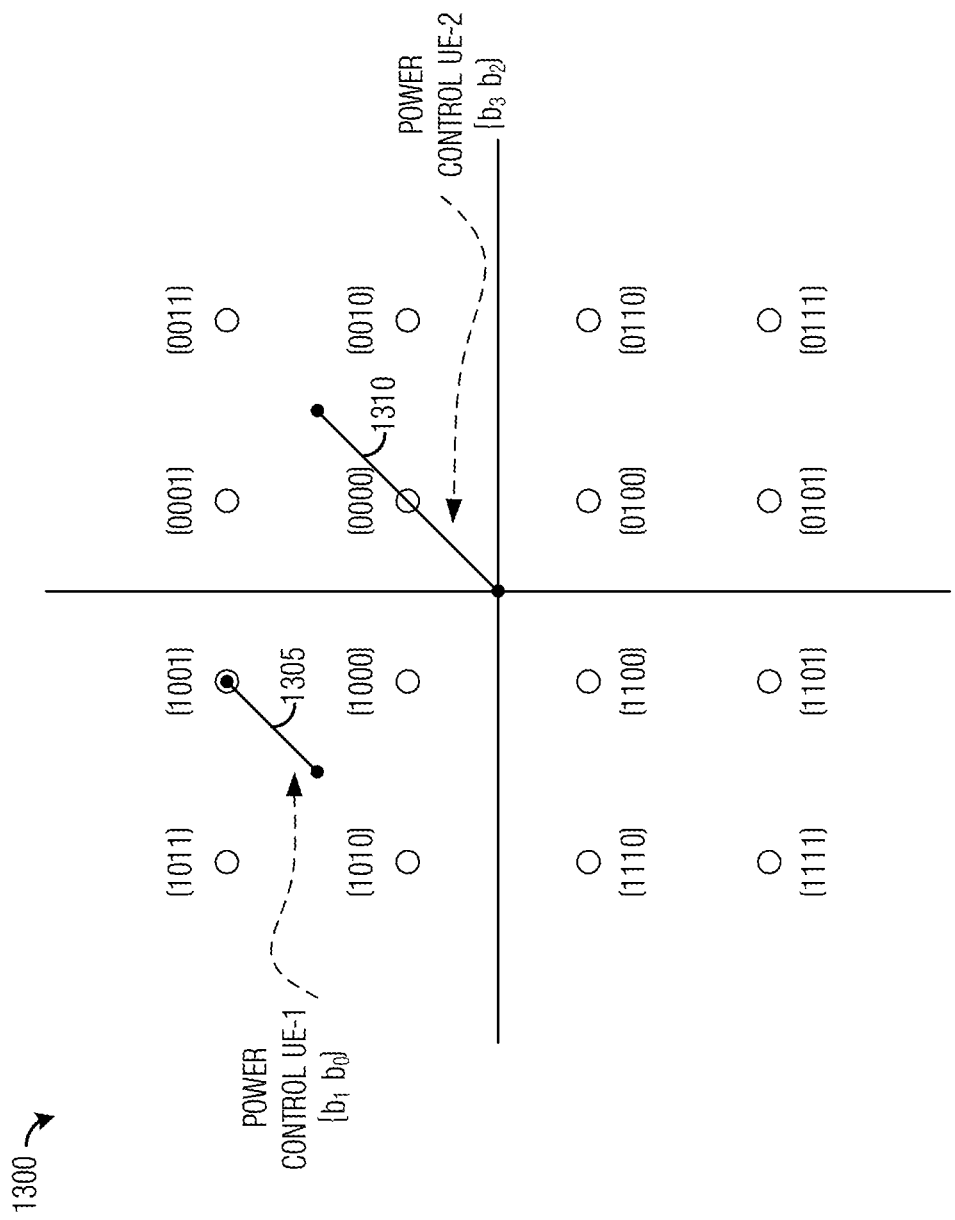
FIG. 13 illustrates a fifth example PMDMA (or SOMA) constellation according to example embodiments described herein.

FIG. 13 illustrates a fifth example PMDMA (or SOMA) constellation 1300. Constellation 1300 may be representative of a selected constellation map as indicated by a transmitting device. A receiving device may be able to determine a power allocation for a first receiving device (e.g., power control 1305) and a power allocation for a second receiving device (e.g., power control 1310). From the two power controls, the receiving device is able to determine the power offset, which is simply a ratio of the two power controls, generally in dB. As an illustrative example, the inherent power offset for constellation 1300 may be expressed as power_offset=power control 1310:power control 1305.

According to an example embodiment, a power offset for receiving devices may be inherently included in a legacy constellation map assigned to the receiving devices. A plurality of legacy constellation maps (such as those defined in 3GPP LTE technical standards, but constellation maps from other technical standards are also applicable) may be used. As an illustrative example, a 16 QAM constellation as defined in the 3GPP LTE technical standards have an inherent power offset of 4 (or 6 dB). The transmitting device may select one of the plurality of legacy constellation maps in accordance with the power offset and send an indicator of the selected constellation map to the receiving devices. As an illustrative example, the transmitting device may select a legacy constellation map out of the plurality of legacy constellation maps with an inherent power offset that most closely matches the power offset. The transmitting device may transmit an index corresponding to the selected legacy constellation map to the receiving devices. The receiving devices may be able to determine the power offset by referencing the selected constellation map and its inherent power offset using the index received from the transmitting device.

Figures 14A, 14B:
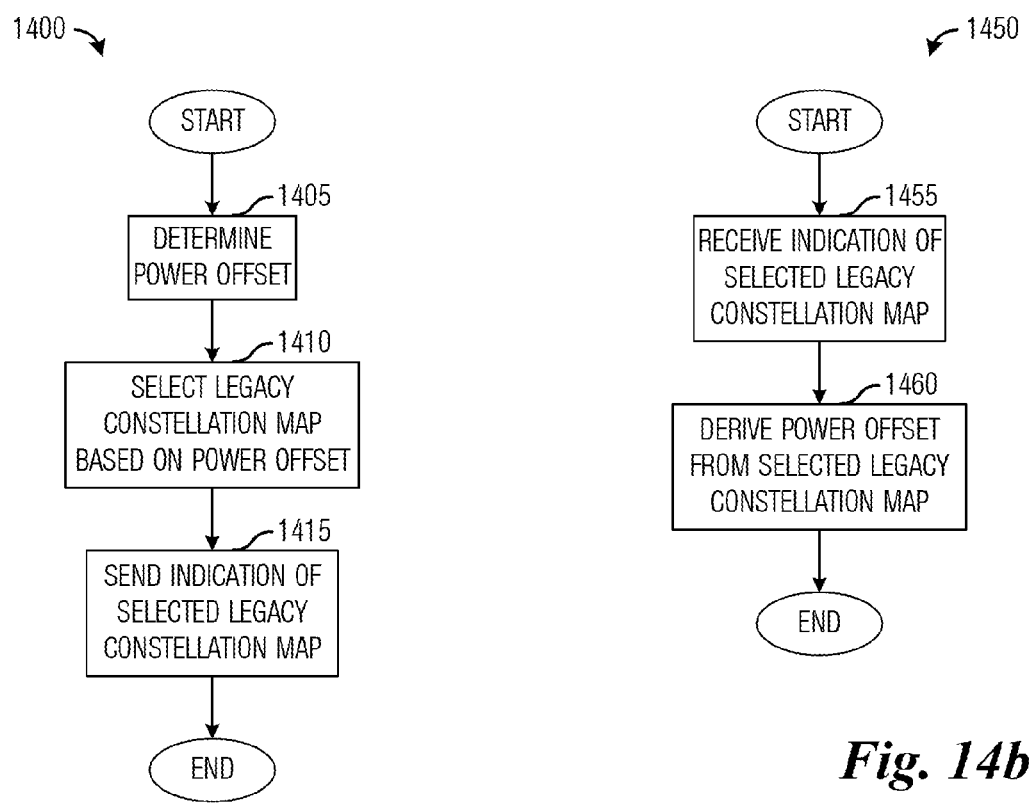
FIG. 14a illustrates a flow diagram of second example operations occurring in a transmitting device implicitly signaling a power offset to a receiving device according to example embodiments described herein.
FIG. 14b illustrates a flow diagram of second example operations occurring in a receiving device receiving implicit signaling of a power offset according to example embodiments described herein.

FIG. 14a illustrates a flow diagram of second example operations 1400 occurring in a transmitting device implicitly signaling a power offset to a receiving device. Operations 1400 may be indicative of operations occurring in a transmitting device as the transmitting device implicitly signals a power offset to a receiving device. The transmitting device may be an eNB, for example.

Operations 1400 may begin with the transmitting device determining a power offset for receiving devices (block 1405). The transmitting device may jointly determine the power offset by determining a first power allocation for a first receiving device with a high quality channel between itself and the transmitting device and a second power allocation for a second receiving device with a low quality channel between itself and the transmitting device. The transmitting device may select one of a plurality of legacy constellation maps with an inherent power offset that most closely matches the power offset (block 1410). As an illustrative example, the inherent power offset of the selected legacy constellation map may be the closest to the power offset determined for the receiving devices. As another illustrative example, the inherent power offset of the selected legacy constellation map may be the smallest inherent power offset greater than the power offset determined for the receiving devices. The transmitting device may send the indication of the selected legacy constellation map to the receiving devices (block 1415). The transmitting device may also send other information to the receiving devices, including QAM layer allocation, coding rate, and the like.

FIG. 14*b* illustrates a flow diagram of second example operations 1450 occurring in a receiving device receiving implicit signaling of a power offset. Operations 1450 may be indicative of operations occurring in a receiving device as the receiving device receives implicit signaling of a power offset. The receiving device may be a UE, for example.

Operations 1450 may begin with the receiving device receiving an indication of a selected legacy constellation map (block 1455). The receiving device may also receive other information from the transmitting device, including QAM layer allocation, coding rate, and the like. The receiving device may determine the power offset from the inherent power offset of the selected legacy constellation map as indicated (block 1460). From the selected legacy constellation map, the receiving device may be able to determine the power offset since the receiving device is able to derive the power allocation for itself and for the other receiving device. The power offset may be derived from the power allocations.

Figures 15A, 15B:
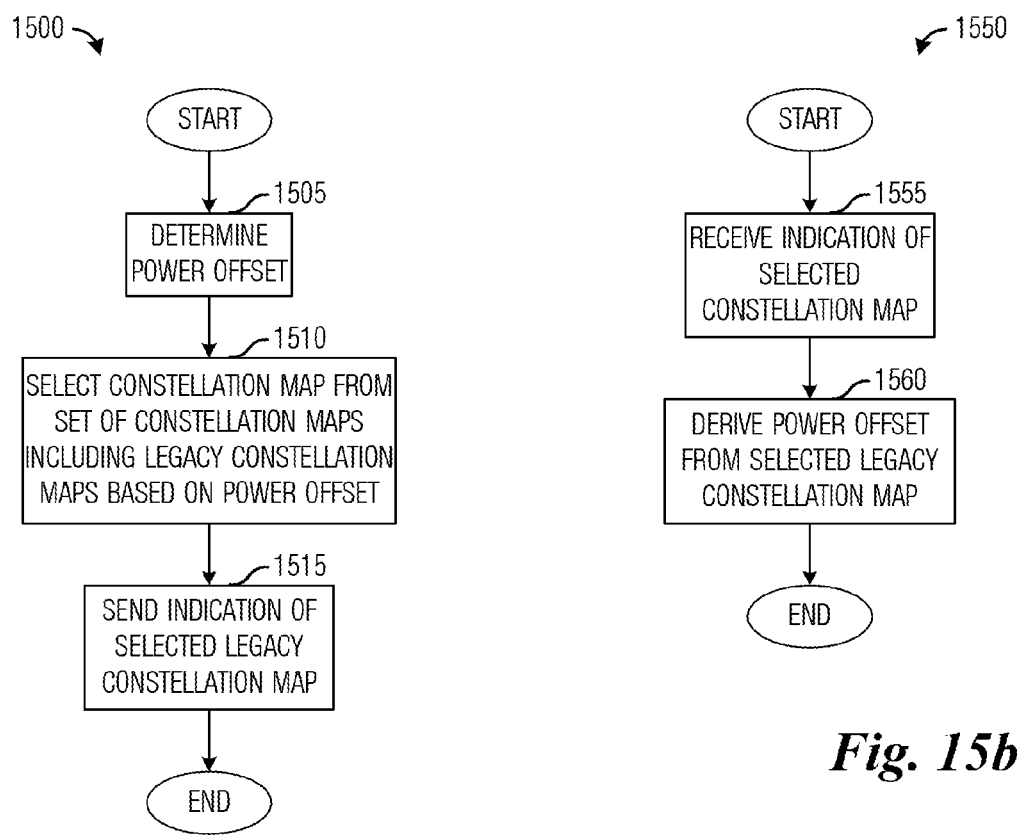
FIG. 15a illustrates a flow diagram of third example operations occurring in a transmitting device implicitly signaling a power offset to a receiving device according to example embodiments described herein.
FIG. 15b illustrates a flow diagram of third example operations occurring in a receiving device receiving implicit signaling of a power offset according to example embodiments described herein.

According to an example embodiment, a power offset for receiving devices may be inherently included in a plurality of constellation maps assigned to the receiving devices where the plurality of constellation maps including legacy constellation maps and non-legacy constellation maps. The legacy constellation maps (such as those defined in 3GPP LTE technical standards, but constellation maps from other technical standards are also applicable) may be used, and the non-legacy constellation maps may be defined to help fill out missing (or gaps in) inherent power offsets present in the legacy constellation maps. The transmitting device may select one of the legacy constellation maps or the non-legacy constellation maps in accordance with the power offset and send an indicator of the selected constellation map to the receiving devices. The selection of either the legacy constellation maps or the non-legacy constellation maps may be dependent on selection criterion such as support for the non-legacy constellation maps, device compatibility, signaling overhead constraints, power offset, and the like. As an illustrative example, the transmitting device may select a legacy constellation map or a non-legacy constellation map with an inherent power offset that most closely matches the power offset or meets the selection criterion. The transmitting device may transmit an index corresponding to the selected constellation map to the receiving devices. The receiving devices may be able to determine the power offset by referencing the selected constellation map using the index received from the transmitting device FIG. 15*a* illustrates a flow diagram of third example operations 1500 occurring in a transmitting device implicitly signaling a power offset to a receiving device. Operations 1500 may be indicative of operations occurring in a transmitting device as the transmitting device implicitly signals a power offset to a receiving device. The transmitting device may be an eNB, for example.

Operations 1500 may begin with the transmitting device determining a power offset for receiving devices (block 1505). The transmitting device may determine the power offset by jointly determining a first power allocation for a first receiving device with a high quality channel between itself and the transmitting device and a second power allocation for a second receiving device with a low quality channel between itself and the transmitting device. The transmitting device may select one of a plurality of legacy constellation maps and non-legacy constellation maps with an inherent power offset that most closely matches the power offset (block 1510). As an illustrative example, the inherent power offset of the selected constellation map (either legacy constellation map or non-legacy constellation map) may be the closest to the power offset determined for the receiving devices. As another illustrative example, the inherent power offset of the selected constellation map (either legacy constellation map or non-legacy constellation map) may be the smallest power offset greater than the power offset determined for the receiving devices. As another illustrative example, the inherent power offset of the selected legacy constellation map is the closest to the power offset but is not a close as some of the non-legacy constellation maps, however, the receiving devices do not support non-legacy constellation maps, so the legacy constellation map is selected. The transmitting device may select the legacy constellation map or the non-legacy constellation based on a selection criterion, including support for the non-legacy constellation maps, device compatibility, signaling overhead constraints, power offset, and the like. The transmitting device may send the indication of the selected constellation map to the receiving devices (block 1515). The transmitting device may also send other information to the receiving devices, including QAM layer allocation, coding rate, and the like.

FIG. 15*b* illustrates a flow diagram of third example operations 1550 occurring in a receiving device receiving implicit signaling of a power offset. Operations 1550 may be indicative of operations occurring in a receiving device as the receiving device receives implicit signaling of a power offset. The receiving device may be a UE, for example.

Figure 16:
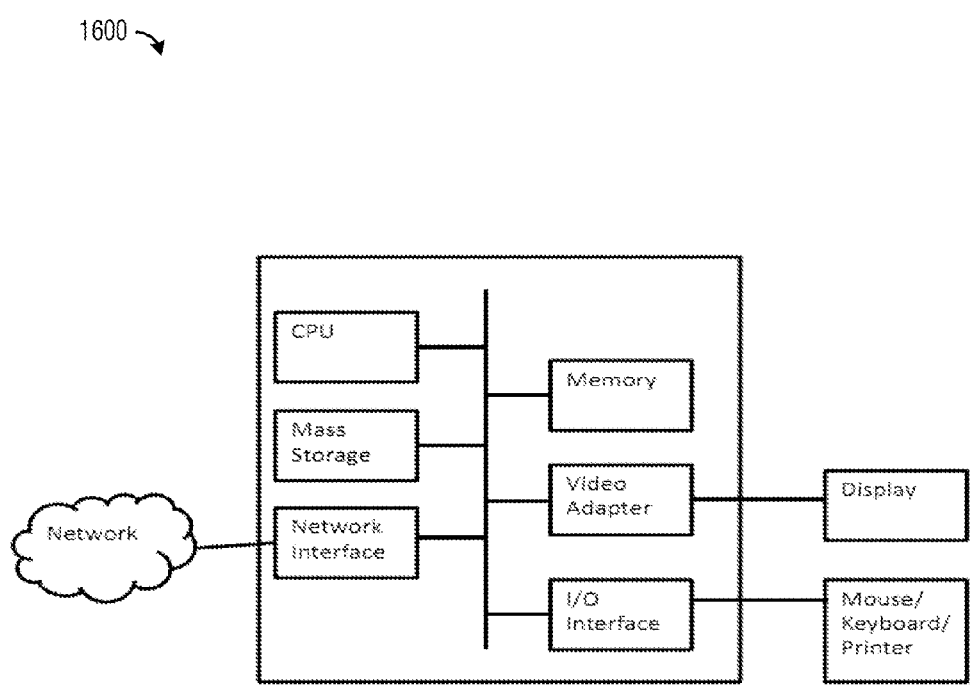
FIG. 16 illustrates a computing platform that may be used for implementing, for example, the devices and methods described herein, according to example embodiments.

Operations 1550 may begin with the receiving device receiving an indication of a selected constellation map (block 1555). The selected constellation map may either be a legacy constellation map or a non-legacy constellation map. The receiving device may also receive other information from the transmitting device, including QAM layer allocation, coding rate, and the like. The receiving device may determine the power offset from the inherent power offset of the selected constellation map as indicated (block 1560). From the selected constellation map, the receiving device may be able to determine the power offset since the receiving device is able to derive the power allocation for itself and for the other receiving device. The power offset may be derived from the power allocations FIG. 16 is a block diagram of a processing system 1600 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 17:
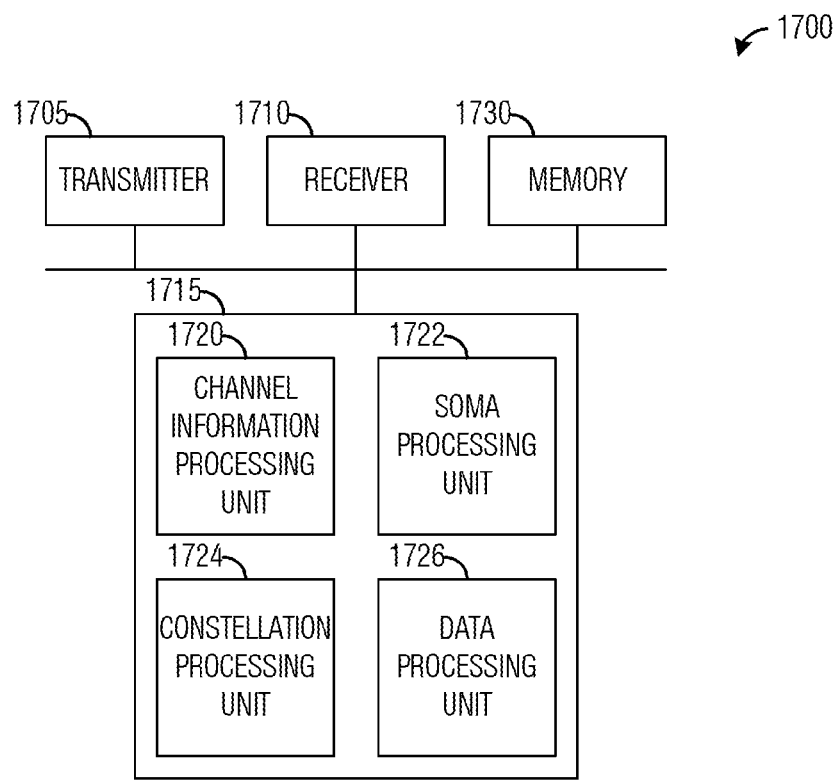
FIG. 17 illustrates an example first communications device according to example embodiments described herein.

FIG. 17 illustrates an example first communications device 1700. Communications device 1700 may be an implementation of a transmitting device, such as an eNB. Communications device 1700 may be used to implement various ones of the embodiments discussed herein. As shown in FIG. 17, a transmitter 1705 is configured to transmit packets, power allocation information, QAM layer information, coding rate information, constellation map information, constellation map indicator, QAM symbols, and the like. Communications device 1700 also includes a receiver 1710 that is configured to receive packets, channel information, and the like.

A channel information processing unit 1720 is configured to process channel information, such as channel state information, channel quality indicators, and the like, to determine a measure of the quality of communications channels between communications device 1700 and UEs. SOMA processing unit 1722 is configured to utilize the measure of the quality of communications channels to determine power allocations (or power offsets), QAM layer assignments, coding rates, constellation map assignments, and the like. A constellation processing unit 1724 is configured to generate constellation maps with varying power offsets. Constellation processing unit 1724 is configured to generate a constellation map indicator for a constellation map assignment. A data processing unit 1726 is configured to decode and/or process received data. Data processing unit 1726 is configured to encode data to be transmitted in accordance with a constellation map assigned to an intended recipient of the data. A memory 1730 is configured to store constellation maps (legacy and non-legacy constellation maps), channel information, power allocations (or power offsets), QAM layer assignments, coding rates, constellation map assignments, received data, data to be transmitted, and the like.

The elements of communications device 1700 may be implemented as specific hardware logic blocks. In an alternative, the elements of communications device 1700 may be implemented as software executing in a processor, controller, application specific integrated circuit, or so on. In yet another alternative, the elements of communications device 1700 may be implemented as a combination of software and/or hardware.

As an example, receiver 1710 and transmitter 1705 may be implemented as a specific hardware block, while channel information processing unit 1720, SOMA processing unit 1722, constellation processing unit 1724, and data processing unit 1726 may be software modules executing in a microprocessor (such as processor 1715) or a custom circuit or a custom compiled logic array of a field programmable logic array. Channel information processing unit 1720, SOMA processing unit 1722, constellation processing unit 1724, and data processing unit 1726 may be modules stored in memory 1730.

Figure 18:
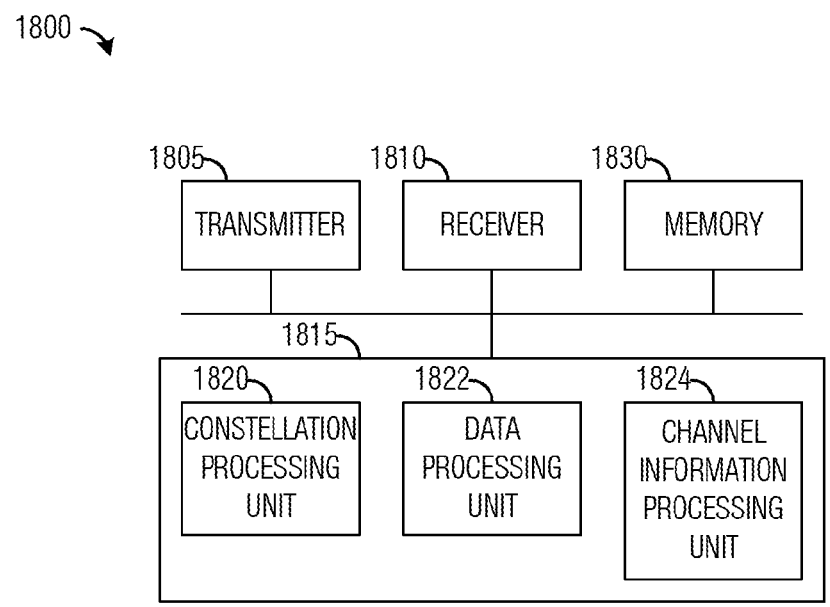
FIG. 18 illustrates an example second communications device according to example embodiments described herein.

FIG. 18 illustrates an example second communications device 1800. Communications device 1800 may be an implementation of a receiving device, such as a UE. Communications device 1800 may be used to implement various ones of the embodiments discussed herein. As shown in FIG. 18, a transmitter 1805 is configured to transmit packets, channel information, QAM symbols, and the like. Communications device 1800 also includes a receiver 1810 that is configured to receive packets, power allocation information, QAM layer information, coding rate information, constellation map information, constellation map indicator, QAM symbols, and the like.

A constellation processing unit 1820 is configured to process information, such as power allocation information, QAM layer information, coding rate information, constellation map information, constellation map indicators, and the like, to determine a constellation map for communications device 1800. As an example, constellation processing unit 1820 is configured to utilize a constellation map indicator to determine a constellation map assigned to communications device 1800. Constellation processing unit 1820 is configured to use the constellation map to determine a power offset for communications device 1800, as well as a power allocation for communications device 1800. Data processing unit 1822 is configured to encode data utilizing the constellation map assigned to communications device 1800. Data processing unit 1822 is configured to generate QAM symbols utilizing the constellation map assigned to communications device 1800. Data processing unit 1822 is configured to process received data. A channel information processing unit 1824 is configured to make measurements of communications channels and to generate channel information, such as channel state information, channel quality indicators, and the like, to reflect the measurements. A memory 1830 is configured to store constellation maps (legacy and non-legacy constellation maps), channel information, power allocations (or power offsets), QAM layer assignments, coding rates, constellation map assignments, received data, data to be transmitted, and the like.

The elements of communications device 1800 may be implemented as specific hardware logic blocks. In an alternative, the elements of communications device 1800 may be implemented as software executing in a processor, controller, application specific integrated circuit, or so on. In yet another alternative, the elements of communications device 1800 may be implemented as a combination of software and/or hardware.

As an example, receiver 1810 and transmitter 1805 may be implemented as a specific hardware block, while constellation processing unit 1820, data processing unit 1822, and channel information processing unit 1824 may be software modules executing in a microprocessor (such as processor 1815) or a custom circuit or a custom compiled logic array of a field programmable logic array. Constellation processing unit 1820, data processing unit 1822, and channel information processing unit 1824 may be modules stored in memory 1830.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a transmitting device using semi-orthogonal multiple access (SOMA), the method comprising:
   determining, by the transmitting device, a first power allocation for a first receiving device, and a joint Gray code mapping in a composite quadrature amplitude modulation (QAM) constellation of signals for the first receiving device and a second receiving device, the composite QAM constellation comprising a first constellation map for the first receiving device and a second constellation map for the second receiving device;
   selecting the composite QAM constellation out of a plurality of constellation maps in accordance with the first power allocation for the first receiving device and a second power allocation for the second receiving device; and
   transmitting, by the transmitting device, information about the first power allocation for the first receiving device, and information about the first constellation map for the first receiving device, to the first receiving device, in accordance with the selected composite QAM constellation.

2. The method of claim 1, further comprising determining coding rates for the first receiving device and the second receiving device in accordance with the first power allocation.

3. The method of claim 2, wherein the information about the first power allocation includes information about the coding rates.

4. The method of claim 1, wherein each map of the first and second constellation maps comprises one or more QAM layers and is a subset of a total number of QAM layers in the composite QAM constellation associated with the first receiving device and the second receiving device.

5. The method of claim 1, wherein the first and second power allocations are performed jointly in accordance with channel information associated with the first receiving device and the second receiving device.

6. The method of claim 1, further comprising transmitting information about the second constellation map for the second receiving device to the second receiving device.

7. The method of claim 1, further comprising transmitting information about the second power allocation for the second receiving device and the second constellation map for the second receiving device to the second receiving device.

8. The method of claim 1, wherein transmitting the information about the first power allocation and the information about the first constellation map comprises:
   transmitting an indicator of the selected composite QAM constellation to the first receiving device.

9. The method of claim 1, wherein the plurality of constellation maps comprises constellation maps with different inherent power offsets, and wherein selecting the composite QAM constellation comprises selecting the composite QAM constellation with an inherent power offset in accordance with a selection criterion.

10. The method of claim 9, wherein the selection criterion comprises at least one of support for non-legacy constellation maps, receiving device compatibility, power offsets, the first and second power allocations, and signaling overhead constraints.

11. The method of claim 1, wherein the plurality of constellation maps comprises legacy constellation maps specified by a technical standard.

12. The method of claim 1, wherein the plurality of constellation maps comprises legacy constellation maps specified by a technical standard and non-legacy constellation maps with different inherent power offsets.

13. The method of claim 1, further comprising:
   deriving the first power allocation in accordance with channel information; and
   determining coding rates in accordance with the channel information.

14. The method of claim 13, wherein the channel information comprises a channel quality indicator (CQI).

15. The method of claim 1, wherein a first channel between the transmitting device and the first receiving device has a high signal to noise ratio (SNR), and wherein a second channel between the transmitting device and the second receiving device has a low SNR.

16. The method of claim 1, further comprising:
   receiving channel information from the first receiving device and the second receiving device.

17. The method of claim 1, further comprising:
   receiving data for the first receiving device and the second receiving device;
   encoding data for the first receiving device in accordance with a first coding rate for the first receiving device, thereby producing first encoded data;
   encoding data for the second receiving device in accordance with a second coding rate for the second receiving device, thereby producing second encoded data;
   modulating the first encoded data in accordance with the first constellation map for the first receiving device and the second encoded data in accordance with the second constellation map for the second receiving device, thereby producing a QAM symbol; and
   transmitting the QAM symbol.

18. The method of claim 17, wherein the QAM symbol is transmitted to the first receiving device and the second receiving device.

19. The method of claim 17, wherein modulating the first encoded data in accordance with the first constellation map for the first receiving device and the second encoded data in accordance with the second constellation map for the second receiving device comprises:
generating the composite QAM constellation in accordance with the first power allocation, and the joint Gray code mapping in the composite QAM constellation; and
modulating the first encoded data and the second encoded data in accordance with the composite QAM constellation, thereby producing the QAM symbol.

20. The method of claim 1, wherein the first power allocation is determined in accordance with channel information associated with the first and second receiving devices.

21. A transmitting device comprising:
a processor configured to:
determine a first power allocation for a first receiving device, and a joint Gray code mapping in a composite quadrature amplitude modulation (QAM) constellation of signals for the first receiving device and a second receiving device, the composite QAM constellation comprising a first constellation map for the first receiving device and a second constellation map for the second receiving device; and
select the composite QAM constellation out of a plurality of constellation maps in accordance with the first power allocation for the first receiving device and a second power allocation for the second receiving device; and
a transmitter operatively coupled to the processor, the transmitter configured to transmit information about the first power allocation for the first receiving device, and information about the first constellation map for the first receiving device, to the first receiving device, in accordance with the selected composite QAM constellation.

22. The transmitting device of claim 21, wherein the processor is configured to determine coding rates for the first receiving device and the second receiving device in accordance with the first power allocation.

23. The transmitting device of claim 21, wherein the transmitter is further configured to transmit information about the second constellation map for the second receiving device to the second receiving device.

24. The transmitting device of claim 21, wherein the transmitter is configured to transmit information about the second power allocation for the second receiving device and the second constellation map for the second receiving device to the second receiving device.

25. The transmitting device of claim 21, wherein the transmitter is configured to transmit a message including the information about the first power allocation and the information about the first constellation map to the first receiving device.

26. The transmitting device of claim 21, wherein the transmitter configured to transmit the information about the first power allocation and the information about the first constellation map comprises the transmitter configured to transmit an indicator of the selected composite QAM constellation to the first receiving device.

27. The transmitting device of claim 21, wherein the plurality of constellation maps comprises constellation maps with different inherent power offsets.

28. The transmitting device of claim 21, wherein the plurality of constellation maps comprises legacy constellation maps specified by a technical standard.

29. The transmitting device of claim 21, wherein the plurality of constellation maps comprises legacy constellation maps specified by a technical standard and non-legacy constellation maps with different inherent power offsets.

30. The transmitting device of claim 21, wherein the processor is configured to select the composite QAM constellation with an inherent power offset in accordance with a selection criterion.

31. The transmitting device of claim 21, wherein the processor is configured to:
derive the first power allocation in accordance with channel information; and
determine coding rates in accordance with the channel information.

32. The transmitting device of claim 21, wherein a first channel between the transmitting device and the first receiving device has a high signal to noise ratio (SNR), and wherein a second channel between the transmitting device and the second receiving device has a low SNR.

33. The transmitting device of claim 21, further comprising a receiver operatively coupled to the processor, the receiver configured to receive channel information from the first receiving device and the second receiving device.

34. The transmitting device of claim 21, further comprising a receiver operatively coupled to the processor, the receiver configured to receive data for the first receiving device and the second receiving device, wherein the processor is configured to encode data for the first receiving device in accordance with a first coding rate for the first receiving device, thereby producing first encoded data, to encode data for the second receiving device in accordance with a second coding rate for the second receiving device, thereby producing second encoded data, and to modulate the first encoded data in accordance with the first constellation map for the first receiving device and the second encoded data in accordance with the second constellation map for the second receiving device, thereby producing a QAM symbol, and wherein the transmitter is configured to transmit the QAM symbol.

35. The transmitting device of claim 34, wherein the processor is configured to generate the composite QAM constellation in accordance with the first power allocation for the first receiving device, the second power allocation for the second receiving device, and the joint Gray code mapping in the composite QAM constellation, and to modulate the first encoded data and the second encoded data in accordance with the composite QAM constellation, thereby producing the QAM symbol.

36. The transmitting device of claim 21, wherein the first power allocation is determined in accordance with channel information associated with the first and second receiving devices.

37. The transmitting device of claim 21, wherein the processor is configured to determine the first power allocation in accordance with channel information associated with the first and second receiving devices.

38. The transmitting device of claim 21, wherein each map of the first and second constellation maps comprises one or more QAM layers and is a subset of a total number of QAM layers in the composite QAM constellation associated with the first receiving device and the second receiving device.

39. A semi-orthogonal multiple access (SOMA) method comprising:
    receiving, by a first receiving device, information about a first power allocation for the first receiving device, and information about a first constellation map of a composite quadrature amplitude modulation (QAM) constellation of signals, wherein the composite QAM constellation is a joint Gray code map of the first constellation map for the first receiving device and a second constellation map for a second receiving device, the composite QAM constellation selected out of a plurality of constellation maps in accordance with the first power allocation for the first receiving device and a second power allocation for the second receiving device; and
    processing the information about the first power allocation and the information about the first constellation map, in accordance with the selected composite QAM constellation.

40. The method of claim 39, further comprising:
    receiving, by the first receiving device, a QAM symbol; and
    demapping, by the first receiving device, the QAM symbol in accordance with the first constellation map.

41. The method of claim 39, wherein receiving the information about the first power allocation and the information about the first constellation map comprises:
    receiving, by the first receiving device, an indicator of the selected composite QAM constellation.

42. A first receiving device comprising:
    a receiver configured to:
        receive information about a first power allocation for the first receiving device, and information about a first constellation map of a composite quadrature amplitude modulation (QAM) constellation of signals, wherein the composite QAM constellation is a joint Gray code map of the first constellation map for the first receiving device and a second constellation map for a second receiving device, the composite QAM constellation selected out of a plurality of constellation maps in accordance with the first power allocation for the first receiving device and a second power allocation for the second receiving device; and
    a processor operatively coupled to the receiver, and configured to process the information about the first power allocation and the information about the first constellation map, in accordance with the selected composite QAM constellation.

43. The first receiving device of claim 42, wherein the receiver is configured to receive a QAM signal, and wherein the processor is configured to demap the QAM symbol in accordance with the first constellation map.

44. The first receiving device of claim 42, wherein the receiver configured to receive the information about the first power allocation and the information about the first constellation map comprises:
    the receiver configured to receive an indicator of the selected composite QAM constellation.

* * * * *